United States Patent
Kirkland, Jr.

[15] 3,695,098
[45] Oct. 3, 1972

[54] METHOD AND APPARATUS FOR ISOLATING AND MEASURING VEHICLE NOISE

[72] Inventor: Kenneth C. Kirkland, Jr., Longview, Tex.

[73] Assignee: Garlock, Inc., Palmyra, N.Y.

[22] Filed: Aug. 27, 1970

[21] Appl. No.: 67,426

[52] U.S. Cl............................73/117.1, 181/0.5 AP
[51] Int. Cl............................................G01m 17/00
[58] Field of Search.........73/117.1, 117; 181/0.5 AP

[56] References Cited

UNITED STATES PATENTS

| | | | |
|---|---|---|---|
| 1,044,121 | 11/1912 | Beall | 73/117 X |
| 1,830,237 | 11/1931 | Morse | 181/0.5 AP |
| 3,326,036 | 6/1967 | Hoeppner | 73/118 |
| 3,127,767 | 4/1964 | Kamp | 73/162 |

Primary Examiner—Jerry W. Myracle
Attorney—Schovee & Boston

[57] ABSTRACT

Method and apparatus for individually isolating and measuring major vehicle noise sources such as the exhaust system, the air intake system and the engine. The noise sources are individually isolated, one at a time, while installed in their normal condition on the vehicle. Noise measurements are then taken on and around the vehicle while the vehicle is located on the ground similar to its operating position on a highway, with no building or reflecting surfaces near the test site which would affect the test results. The noises are individually isolated by parking the vehicle on top of a subterranean building having a soundproof room therein and by locating all but the one noise source being measured in the soundproof room. Standard measurement and analysis equipment are used.

16 Claims, 3 Drawing Figures

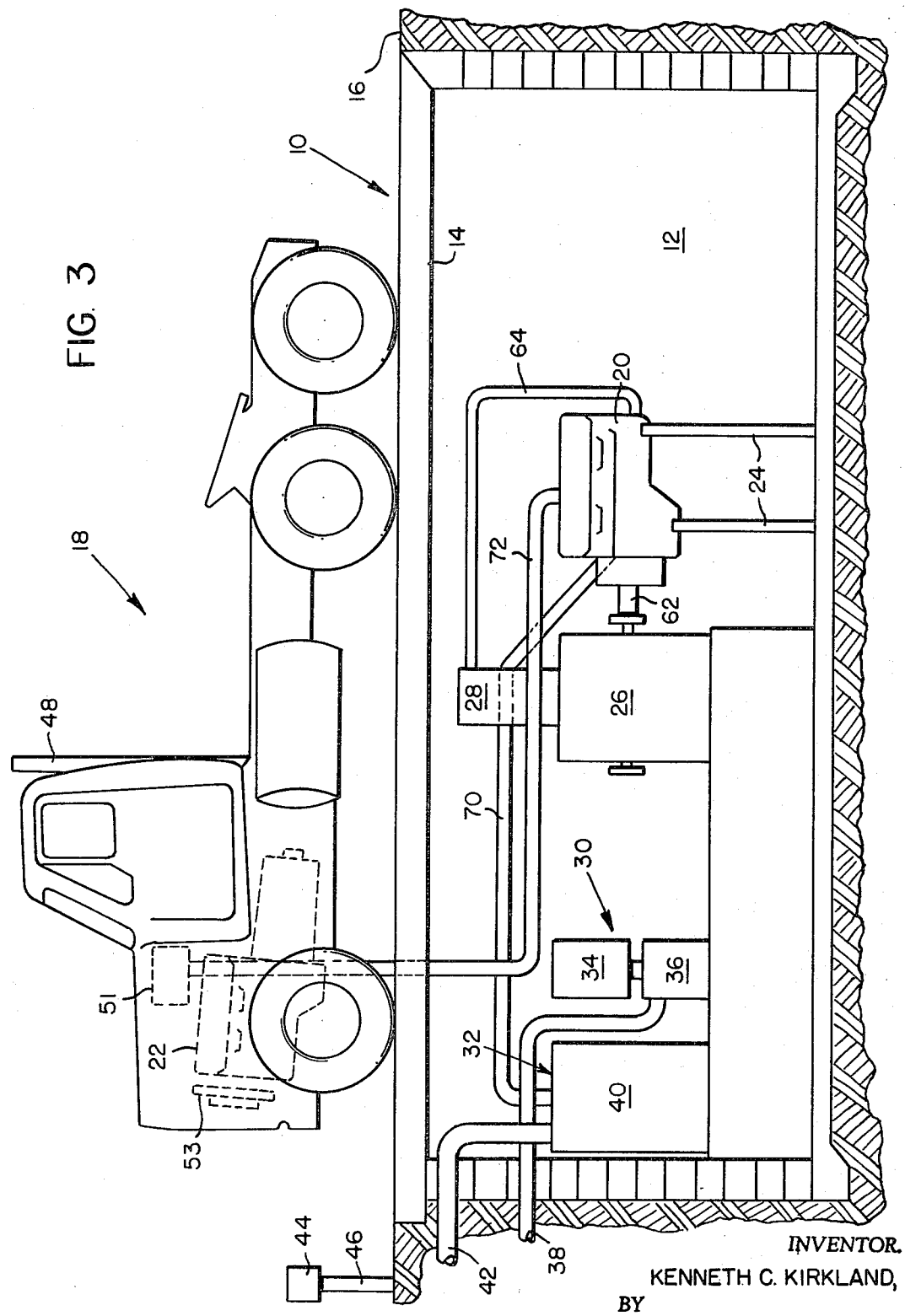

METHOD AND APPARATUS FOR ISOLATING AND MEASURING VEHICLE NOISE

BACKGROUND OF THE INVENTION

1. Field of the Invention

The present invention relates broadly to the problem of reducing truck noise and in particular to a method and apparatus for isolating and measuring major vehicle noise sources.

2. Description of the Prior Art

It is known to measure the total truck noise that a truck makes as it runs down a highway, and state laws specify maximum lawful noise levels. However, all that can be learned on the usual "drive-by" test is whether or not the vehicle is within acceptable limits. The prior art does not disclose the claimed method or apparatus for individually isolating and measuring the major noise sources of a vehicle, while the noise sources are on the vehicle to their normal operating condition, to provided data for analyzing the noise produced by a vehicle.

SUMMARY OF THE INVENTION

A method and apparatus for individually isolating and measuring the major noise sources of a vehicle. The vehicle is driven onto the roof on a subterranean building having a soundproof room therein and all but the one noise source to be measured are located in the soundproof room. The one noise source to be measured is then operated throughout at least a portion of its normal noise producing range, and noise measurements are taken at various locations on and around the vehicle. The land is preferably level adjacent the vehicle and no sound reflective surfaces are allowed within a predetermined radius around the vehicle. Engine noise is measured by connecting the vehicle engine to a secondary exhaust system, an intake system, and cooling system located in the soundproof room, and by removing the cooling fan from the engine. Exhaust noise is measured by maintaining the vehicle engine "off," and by running a secondary engine (identical to the vehicle engine) positioned in the soundproof room and connected to the exhaust system of the vehicle. The secondary engine is connected to the secondary air intake system and cooling system in the soundproof room, so that the only noise generated from the vehicle is that emitted from the exhaust system. Air intake noise is measured in the same way as is exhaust noise, except that the secondary engine is connected to the air intake system of the vehicle and to the secondary exhaust system and cooling system in the soundproof room.

BRIEF DESCRIPTION OF THE DRAWINGS

The present invention will be more fully understood by reference to the following detailed description thereof, when read in conjunction with the attached drawings, wherein like reference numerals refer to like elements and wherein:

FIGS. 2 and 3 are similar to FIG. 1 except that they show the connections made for measuring exhaust noise and air intake noise respectively.

DETAILED DESCRIPTION OF THE PREFERRED EMBODIMENTS

Figure 1:
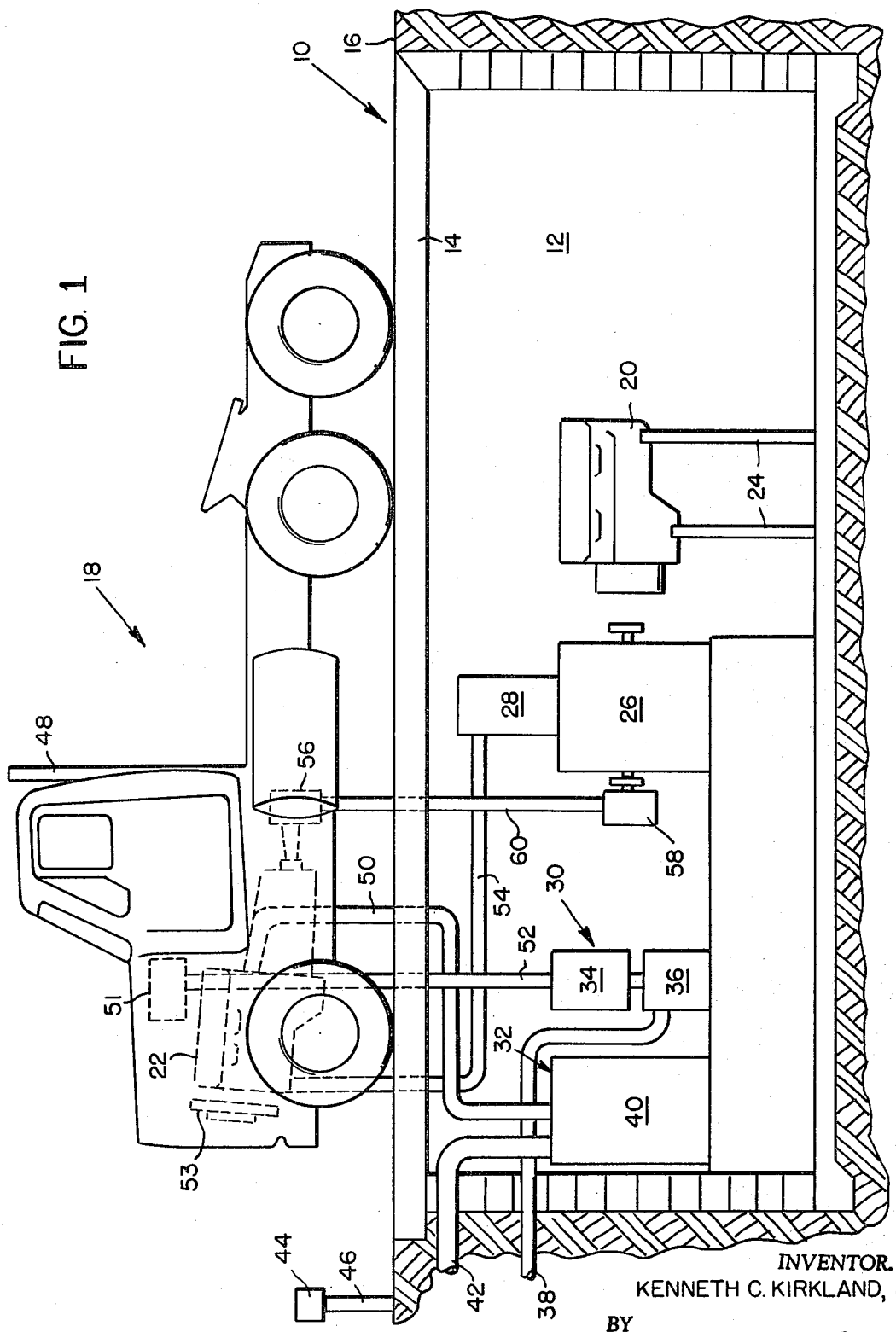
FIG. 1 is a partly schematic vertical, partial cross-sectional view of the apparatus of the present invention for measuring engine noise.

Reference will first be made generally to FIG. 1 showing all of the elements of the test facility used to isolate and measure the major noise sources of a vehicle, and reference will then be made in detail to FIGS. 1, 2, and 3 which show the connections made for isolating engine noise, exhaust noise, and air intake noise, respectively. FIG. 1 shows a subterranean building 10 having a soundproof room 12 therein, constructed to prevent any sound or noise existing therein from producing any sound outside the building 10. Preferably, there are no above ground sound reflective surfaces within 300 feet of the building 10. The building 10 includes a roof 14 positioned at a ground level 16; the roof 14 is constructed strong enough to support a vehicle 18. Located within the room 12 are a secondary engine 20, identical or equivalent to an engine 22 in the vehicle 18, and supported on supports 24. Also positioned in the room 12 is a dynamometer 26 to which either one of the vehicle engine 22 or the secondary engine 20 can be connected. The dynamometer 26 be of either the electric or water brake type, and it is used, as will be understood by one skilled in the art, to absorb the horse power output of the engine to which it is connected. The room 12 also contains a secondary engine cooling system 28 to which either the vehicle engine 22 or the secondary engine 20 can be connected. The cooling system is preferably a heat exchanger of the cross flow or parallel flow water-to-water type. A secondary air intake system 30 and a secondary engine exhaust system 32 are also in the room 12. The air intake system 30 preferably comprises an air intake silencer 34 connected to an air cleaner 36, connected in turn to an air intake pipe 38 having an air inlet opening (not shown) located above ground but at a sufficient distance from the building 10 such that it produces no measurable sound at the site of the building 10. The exhaust system 32 includes a large muffler 40 connected to an exhaust pipe 42 having a discharge opening (not shown) positioned above ground but at a sufficient distance from the building 10 such that it produces no sound at the site of the building 10.

A sound level testing meter 44, shown positioned on a support 46, is positioned at various locations on and around the vehicle 18 to measure the amount of sound produced by each of the individually isolated noise sources. The two preferred locations are at the operator's position in the cab and at 50 feet to the side of the vehicle 18. The measurement and analysis of the noise sources is accomplished by use of existing noise measuring instruments, such as the Bruel and Kjaer type 2203 precision sound level meter or 2107 frequency analyzer or the General Radio 1561 precision sound level meter or recording sound and vibration analyzer 1911-A

ISOLATING AND MEASURING ENGINE NOISE

With detailed reference now to isolating and measuring engine noise according to the present invention, FIG. 1 shows the exhaust noise having been eliminated from the vehicle 18 by disconnecting an exhaust system 48 of the vehicle 18 from the vehicle engine 22 and by connecting the engine 22, by means of a pipe 50, to the exhaust system 32 in the room 12. The air intake noise is eliminated by disconnecting the engine 22 from its air intake system 51 and by connecting the engine 22, by means of a pipe 52, to the air intake system 30 in the room 12.

Noise from the vehicle engine 22 cooling fan (not shown) is eliminated by removing the fan and by disconnecting the original cooling lines (not shown) to a radiator 53 and connecting cooling lines 54 (schematically shown) from the vehicle engine 22 to the cooling system 28 in the room 12.

The tire noise of the vehicle 18 is eliminated by disconnecting the engine 22 from the original drive shaft (not shown) and by connecting it to the dynamometer 26 by means of a pair of 90° power transfer cases 56 and 58 connected by a shaft 60.

After eliminating the exhaust, air intake, cooling fan, and tire noise sources from the vehicle 18, the vehicle engine 22 is run, while still installed in the vehicle, under various load and speed conditions, and sound level measurements are taken as desired. It should be noted here that the present invention is concerned primarily with the major noise sources of the vehicle 18 and that in the above described test measuring "pure" engine noise, the engine includes all the accessories attached solidly to the engine such as the alternator, power steering, fuel pump, transmission etc., because these objects are set into vibration by the engine and therefore become engine-induced noise sources.

ISOLATING AND MEASURING EXHAUST NOISE

Figure 2:
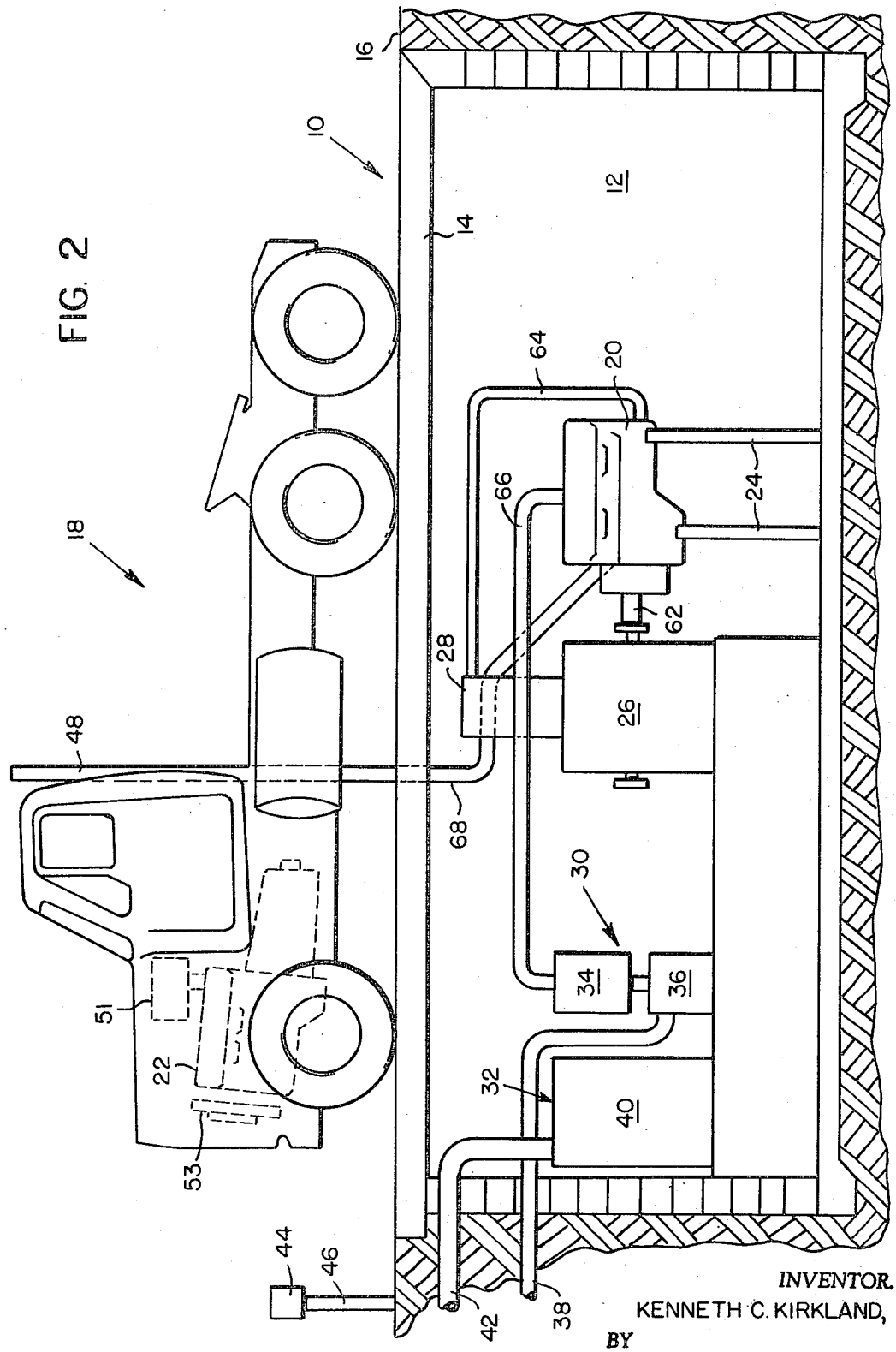

With reference to FIG. 2, exhaust noise is individually isolated on the vehicle 18 as follows: the secondary engine 20 in the room 12 is connected by means of shaft 62, to the dynamometer 26. The secondary engine 20 is connected to the secondary cooling system 28 by a pair of cooling lines 64 (schematically shown) and to the secondary air intake system 30 by a pipe 66. The secondary engine 20 is connected by a pipe 68, to the exhaust system 48 of the vehicle 18. The vehicle engine 22 is maintained "off." By this means, the exhaust noise of vehicle 18 is isolated, on the vehicle, and is measured by running the secondary engine 20 in the room 12. The exhaust noise is measured as discussed above regarding engine noise. Preferably, the vehicle 18 is positioned such that engine 22 is directly over secondary engine 20 and the length of pipe 68 to the muffler (not shown) of the vehicle 18 is equal to the length of the vehicle pipe (not shown) from the engine 22 to the muffler of exhaust system 48.

ISOLATING AND MEASURING AIR INTAKE NOISE

With reference to FIG. 3, air intake noise is individually isolated on the vehicle 18 by maintaining the vehicle engine 22 "off" and by connecting the secondary engine 20 to the dynamometer 26 by shaft 62. The secondary engine 20 is connected to the secondary exhaust system 32 in the room 12 by means of pipe 70. The secondary engine 20 is connected, through the roof of the building 10, by means of a pipe 72 to the air intake system 51 of the vehicle 18. In this way, the air intake noise of the vehicle 18 is isolated for measurement as discussed above regarding engine noise.

Fan noise can be measured by motoring the fan (not shown) with an electric motor (not shown) while the fan is installed on its brackets in the vehicle 18 and without running the vehicle engine 24. In this way the fan noise is isolated and it can be measured by the noise measuring equipment positioned at desired locations on and around the vehicle 18. If the electric motor is quiet enough it need not be placed in the soundproof room 12 but can be placed on top of the roof 14.

Tire noise can be derived by subtracting the four noise sources, i.e., engine noise, exhaust noise, air intake noise, and fan noise from total vehicle noise.

While the present invention has been described with reference to the preferred methods and apparatus of the present invention, it is to be understood that variations therein will be evident to one skilled in the art, and the present invention is not to be limited to the preferred embodiments described in detail above. For example, the method and apparatus can be used to measure noise sources other than the major noise sources discussed above, and on other vehicles than on trucks. The soundproof room 12 can contain a plurality of different engines to provide a quick change from testing one type of vehicle to another type using a different engine. The soundproof room need not have a roof at ground level but may be positioned further below ground with the truck resting at ground level. The building 10 can be located above ground adjacent to the vehicle and designed so as not to produce, by reflection, any extraneous sounds that will be picked up by the noise measuring equipment; for example, the building can be covered with a noise absorbent material or shaped to reflect noise in directions other than the direction of the noise measuring equipment. The building 10 can be located above ground and the vehicle driven up on top of the building. Instead of using a secondary engine in the room 12 for isolating exhaust and air intake noise, the vehicle engine 22 can be removed from the vehicle and placed in room 12. Basically, the present invention contemplates the method and apparatus for individually isolating various noise sources of the vehicle while the noise sources are installed in their natural condition on the vehicle and measuring the isolated noise source while the vehicle is located on the ground similar to its operating position on a highway. Since the individual noise sources, when they are on the vehicle, impart a vibration to the sheet metal of the truck body and thus create additional noise, an accurate evaluation of each noise source can be made by the present invention, wherein the noise sources are each measured while they are on the vehicle.

The invention has been described in detail with particular reference to preferred embodiments thereof, but it will be understood that variations and modifications can be effected within the spirit and scope of the invention as described hereinabove and as defined in the appended claims.

I claim:

1. A method for individually isolating and measuring noise sources of a vehicle having an engine comprising:
   a. positioning the vehicle on the roof of a subterranean building having a soundproof room therein;
   b. removing the noise from all other major noise sources on said vehicle except one, while retaining said other noise sources on said vehicle, by ceasing the operation of said other major noise sources;

c. operating said one noise source while all of said other major noise sources are still on said vehicle, and said one noise source is still in its normal operating condition; and d. measuring, at a location outside of said building, the sound emitted from said vehicle, while said one noise source is operating in its normal condition on said vehicle and while said other major noise sources are still on said vehicle.

2. The method according to claim 1 including repeating steps (b), (c), and (d) for a different said one noise source.

3. The method according to claim 1 wherein said operating step comprises operating said noise source throughout a range of noise levels for said one noise source.

4. The method according to claim 1 wherein said measuring step comprises measuring the sound emitted from said one noise source at a plurality of different locations on and around said vehicle.

5. The method according to claim 1 including maintaining the area within a predetermined radius of said building free of sound reflecting surfaces.

6. The method according to claim 1 wherein said vehicle has an engine, an exhaust system, an air intake system, and a cooling system, and wherein said one noise source is engine noise and wherein said removing step comprises:

i. eliminating the exhaust noise by disconnecting the vehicle engine from its exhaust system and by connecting the vehicle engine to a secondary exhaust system within said soundproof room.

ii. eliminating the air intake noise by disconnecting the vehicle engine from its normal air intake system and by connecting the vehicle engine to a secondary air intake system within said soundproof room;

iii. eliminating the cooling fan noise be removing the cooling fan from the vehicle engine and by disconnecting the vehicle engine from its radiator and by connecting the vehicle engine to a secondary cooling system within said soundproof room; and iv. eliminating tire noise by disconnecting the vehicle engine from its normal drive shaft and by connecting the vehicle engine to a dynamometer within said soundproof room.

7. The method according to claim 1 wherein said vehicle has an engine, an exhaust system, an air intake system, and a cooling system, and wherein said one noise source is exhaust noise and wherein said removing step comprises:

i. maintaining the vehicle engine in its off condition;

ii. providing a secondary engine equivalent to said vehicle engine, within said soundproof room;

iii. connecting said secondary engine to a dynamometer within said soundproof room;

iv. connecting said secondary engine to a secondary cooling system within said soundproof room;

v. connecting said secondary engine to a secondary air intake system within said soundproof room; and vi. connecting said secondary engine to the normal exhaust system on said vehicle.

8. The method according to claim 7 including employing a pipe from said secondary engine to a muffler of said normal exhaust system on said truck of approximately equal length to the pipe running from said vehicle engine to said muffler.

9. The method according to claim 1 wherein said vehicle has an engine, an exhaust system, an air intake system, and a cooling system, and wherein said one noise source is air intake noise and wherein said removing step comprises:

i. maintaining said vehicle engine in its off condition;

ii. providing a secondary engine in said soundproof room equivalent to said vehicle engine;

iii. connecting said secondary engine to a dynamometer within said soundproof room;

iv. connecting said secondary engine to a secondary cooling system within said soundproof room;

v. connecting said secondary engine to a secondary exhaust system within said soundproof room; and vi. connecting said secondary engine to said vehicle air intake system.

10. The method according to claim 1 wherein said ceasing step comprises disconnecting said other major noise sources from said one, and by connecting said one major noise source to secondary noise sources positioned in said soundproof room, whereby said one major noise source can be operated in its normal condition.

11. A method for individually isolating and measuring noise sources of a vehicle having an engine comprising:

a. positioning said vehicle adjacent a building having a soundproof room;

b. individually isolating any one major noise source of said vehicle, while all of said major noise sources are located on said vehicle, by eliminating from said vehicle the noise produced by all other major noise sources except said one by ceasing the operation of said other major noise sources;

c. operating said one noise source in its normal condition; and d. measuring, at a location outside of said building, the sound emitted from said vehicle, while said one noise source is operating in its normal condition on said vehicle and while said other major noise sources are still on said vehicle.

12. A method for measuring noise produced by a vehicle having the three major noise sources of an engine, an engine exhaust system, and an engine air intake system comprising sequentially, individually, isolating the noise produced by: said vehicle engine, said vehicle engine exhaust system, and said vehicle engine air intake system, while each one of the above-listed elements is located on said vehicle, by eliminating the noise produced by the other two noise sources by ceasing their operation, and sequentially measuring the noise produced by said vehicle with all three noise sources on the vehicle, and with the noise from two of the three sources having been eliminated.

13. Apparatus for individually isolating noise sources of a vehicle having an engine comprising:

a. a subterranean building having a soundproof room therein and having a roof, and a vehicle having an engine and being positioned on said roof;

b. a secondary engine positioned in said soundproof room equivalent to said vehicle engine;

c. a dynamometer in said room;
d. a secondary cooling system in said room;
e. a secondary exhaust system in said room;
f. a secondary air intake system in said room; and
g. means for independently connecting said elements (c), (d), (e), and (f) to one of said vehicle engine and said secondary engine.

14. The apparatus according to claim 13 wherein said secondary exhaust system includes an exhaust pipe extending away from said building and having an exhaust opening above ground located sufficiently far from said building that any sound produced at said opening will not affect any sound measurements taken adjacent said building.

15. The apparatus according to claim 13 wherein said air intake system includes an air intake pipe extending away from said building and having an air inlet opening above ground located sufficiently far from said building that any sound produced at said opening will not affect any sound measurements taken adjacent said building.

16. The apparatus according to claim 13 including an area, within a predetermined radius of said building, free of sound reflecting surfaces.

* * * * *